United States Patent [19]
Johnson et al.

[11] Patent Number: 4,873,415
[45] Date of Patent: Oct. 10, 1989

[54] METHOD FOR WELDING GALVANIZED MATERIAL

[75] Inventors: Trevor A. Johnson, Orland Park, Ill.; Sharon L. Gorscak, Ann Arbor, Mich.

[73] Assignee: Raycon Corporation, Ann Arbor, Mich.

[21] Appl. No.: 151,465

[22] Filed: Feb. 2, 1988

[51] Int. Cl.$^4$ ............................................. B23K 26/00
[52] U.S. Cl. ........................... 219/121.64; 219/121.63
[58] Field of Search ..................... 219/121.13, 121.14, 219/121.15, 121.45, 121.46, 121.47, 121.63, 121.64, 121.84

[56] References Cited

U.S. PATENT DOCUMENTS 4,682,002 7/1987 Delle Piane et al. ...... 219/121.63 X
4,745,257 5/1988 Rito et al. ...................... 219/121.64

FOREIGN PATENT DOCUMENTS 6157913 10/1985 European Pat. Off. ....... 219/121.64
2600923 1/1988 France ........................... 219/121.64
60-255294 12/1985 Japan ............................. 219/121.64
0027189 2/1986 Japan ............................. 219/121.64

Primary Examiner—C. L. Albritton
Attorney, Agent, or Firm—John C. Evans

[57] ABSTRACT

A method for welding galvanized material including a low vapor pressure mild steel core and a high vapor pressure rich zinc coating includes the steps of arranging components of such galvanized material in juxtaposed relationship at a lapped joint; and applying a high density laser energy beam along the lapped joint as a weave pattern in which the weave pattern has a width great enough to bridge the lapped joint and a weave pattern frequency which forms a predetermined weld pool between the components and wherein the lapped joint and weave pattern combine to define a vapor pressure relief path so that the weld pool will not be disrupted during the application of the high density laser energy beam to the galvanized components.

16 Claims, 7 Drawing Sheets

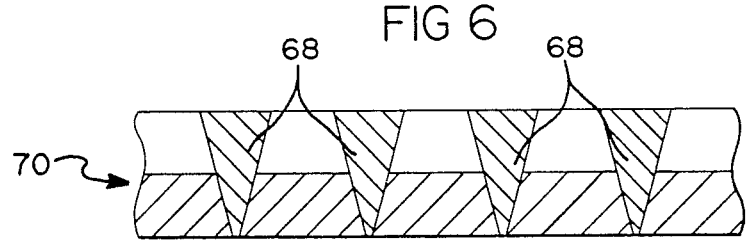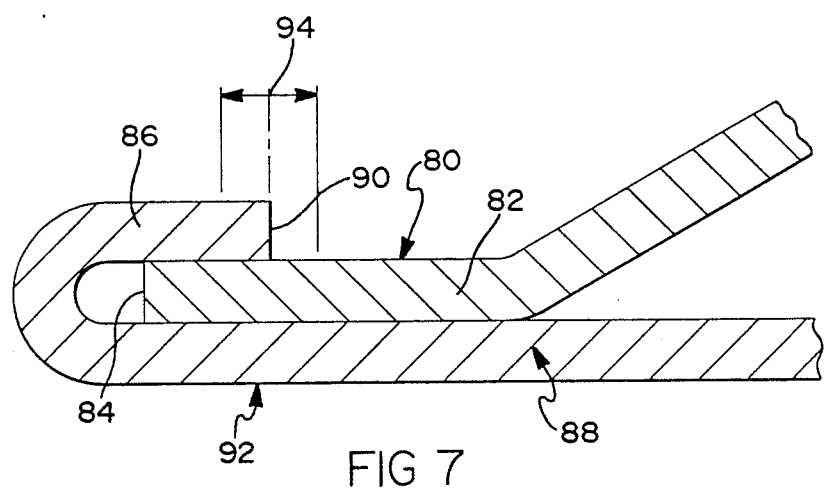

METHOD FOR WELDING GALVANIZED MATERIAL

BACKGROUND OF THE INVENTION

This invention relates to methods for welding galvanized material and more particularly to methods for welding galvanized material without disruption of weld pools by vapor pressure generated by a zinc rich coating at a weld joint.

One problem in the welding of galvanized material arises because the zinc rich coating has a higher vapor pressure than the material of the mild steel onto which the galvanized coating is applied. Molten weld pools can be disrupted by the high vapor pressure which is generated when such coating is melted during the welding process. Consequently, the weld zone may be distorted resulting in poor quality welds.

U.S. Pat. Nos. 3,881,084 and 3,969,604 disclose a method for welding sheet metal material having a galvanized coating. The methods use electron or laser beams which penetrate the pieces and the problem of vapor pressure disruption is purportedly solved by alloying a substance with the zinc rich coating to produce a lower vapor pressure which will not adversely affect the quality of the weld. The '084 patent provides an iron oxide coating at the galvanized joint to produce vapor pressure reduction.

U.S. Pat. No. 4,661,677 discloses a deep penetration laser welding process that forms a patterned seam to join two separate parts. The parts are not galvanized and do not have the vapor pressure disruption problem solved by the present invention.

U.S. Pat. No. 4,642,446 discloses a method for laser welding a lap joint between galvanized sheet metal parts. The method uses a nickel coating to reduce the vapor pressure of the galvanized coat to thereby solve the problem of weld disruption.

Other known process include the provision of shims between first and second galvanized sheets to form a gap therebetween for the escape of the high vapor pressure produced by the galvanized coating during the weld process. Such shimming methods introduce a space between the material interfaces to define an alternative escape route for vapor pressure which would otherwise disrupt the weld pool. The problem with such an arrangement is that the space between the shimmed parts must be held constant or near constant to assure that the weld beam will be precisely positioned to form uniform welds at the sheets to be joined. In continuous processes the tolerance requirements to achieve such results are extremely tight and as a practical matter are difficult to maintain.

SUMMARY OF THE INVENTION

One feature of the present invention is the provision of an improved method for welding galvanized material without vapor pressure disruption of weld pools formed between standard galvanized components.

The term "standard galvanized components" means materials which include a mild steel core covered with a zinc rich coating and wherein special alloy materials to reduce the vapor pressure of the coating are not required. The term "protective coated components" includes materials which have a core with a protective metallic coating with a high vapor pressure including, but not limited to, standard galvanized components.

While the method is applicable to materials in which such special alloying materials are not used it is nevertheless equally applicable to such materials with it being understood that the method of the present invention will afford another level of protection against undesirable vapor pressure disruption of a molten weld pool.

Another feature of the present invention is that it enables sheet metal galvanized material to be joined at a lap joint without requiring precision shims therebetween to form a vapor pressure escape path.

Another aspect of the present invention is to improve a method for joining galvanized components having a coating with a vapor pressure greater than the vapor pressure of the coated material by use of energy which forms a molten weld pool between the components. The pool when cooled joins the components. The improved method more particularly comprises steps including: positioning the galvanized components in a preselected relationship to define a vapor pressure relief path; applying a continuous stream of non-contact weld energy to the positioned galvanized components to progressively melt segments of each of the components to form a melt pool; maintaining access from the melt pool to the vapor pressure relief path to prevent vapor pressure disruption of the melt pool; and progressively cooling the melt pool to bond the galvanized components together as the non-contact weld energy is applied thereto.

In one working embodiment the method of the present invention employs two sheets of galvanized material having a mild steel core covered with a zinc rich coating. The sheets are joined at edges thereon to form a juxtaposed lap joint. A high density energy beam is then advanced in a weave pattern with respect to the lap joint to periodically penetrate the lapped sheets to form spaced a weld pool at a frequency which will provide a predetermined weld strength at the lap joint and wherein the pattern cooperates with the geometry of the lap joint to define vapor release path for the escape of high pressure vapor from the molten weld pool to prevent disruption of the weld pool during the weld process. The width of the weld weave pattern is selected to cover the edge of the lap joint equally on both sides and it is formed continuously along the length of the lap joint. In another embodiment the lap joint is formed as a clinched assembly in which one of the sheet edges is bent over the edge of the other sheet to form the lap joint to be connected by the weave pattern of the high density energy beam.

Additional features and advantages of the present invention will become apparent from the following detailed description of a preferred embodiment of the invention when considered in conjunction with the accompanying drawings:

BRIEF DESCRIPTION OF THE DRAWINGS

FIG. 6 is a sectional view taken along line 6—6 of FIG. 5 looking in the direction of the arrows; and FIG. 7 is a sectional view of a joint used in practicing a second embodiment of the present invention.

DETAILED DESCRIPTION OF THE PREFERRED EMBODIMENT

Figure 1:
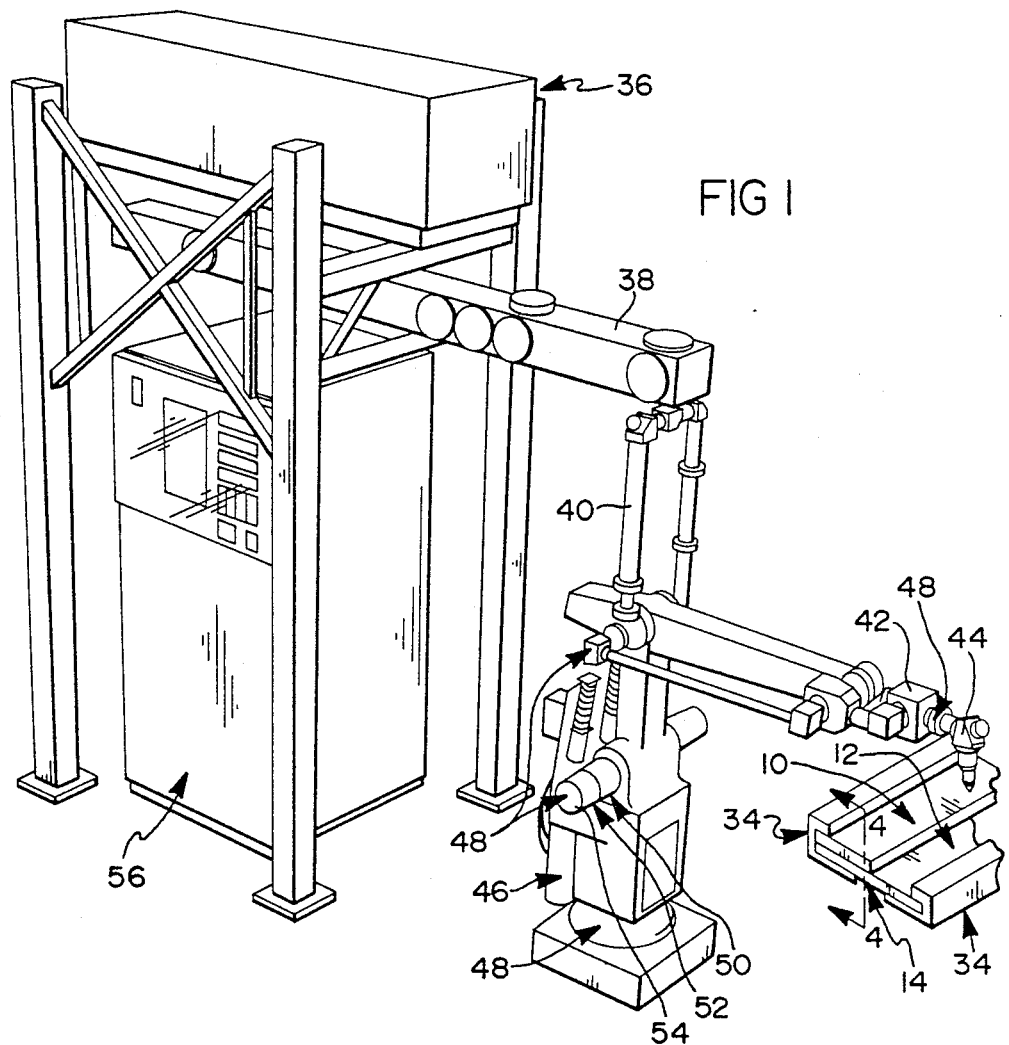
FIG. 1 is a perspective view of equipment used in practicing embodiment of the invention.
Figure 2:
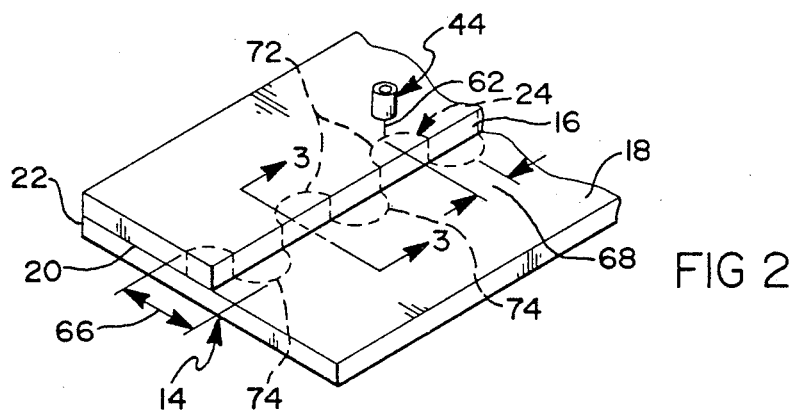
FIG. 2 is an enlarged perspective view of a weld weave pattern generated by the equipment of FIG. 1.

Referring to FIG. 1, two galvanized sheets 10, 12 are shown arranged in juxtaposed relationship to form a lap joint 14. More particularly, the sheet 10 has a side edge 16 located in overlapping relationship with a surface 18 of the sheet 12. Surface 18 engages surface 20 of the sheet 10. An edge 22 of sheet 10 is located in an offset relationship to the edge 16 to form a lap overlay which will accommodate a weld weave pattern 24 to be described.

Figure 4:
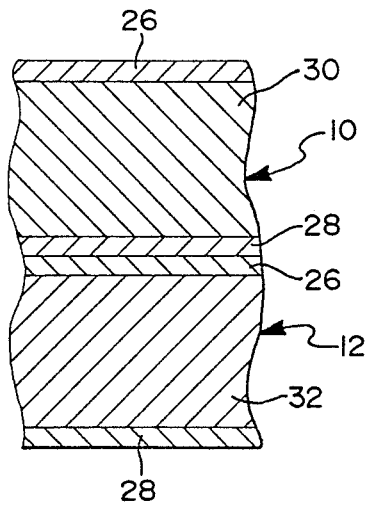
FIG. 4 is a fragmentary sectional view taken along 4—4 of FIG. 1 looking in the direction of the arrows and showing lapped galvanized sheets prior to welding.

As shown in FIG. 4 each of the sheets 10, include coatings 26, 28 of zinc rich galvanizing material such as Zincrometal (trademark Diamond Shamrock Corporation) which is representative of a zinc rich coating of galvanized material found on sheet metal components to be joined by the method of the present invention. While this discussion is with reference to galvanized materials, it is equally applicable to other protective coated components with a coating which generates high vapor pressure.

The coatings 26, 28 are applied to a core 30, 32 of electroplated mild steel with a gum coating of zinc. In one embodiment, the metal thickness of the cores 30, 32 is 0.8 mm and the coating thicknesses are 0.013 mm.

The flat sheets are held by suitable fixturing to form the lap joint 14. Such fixture means are diagrammatically shown by reference numeral 34.

A Ferranti MFK CO2 laser is diagrammatically shown at reference numeral 36. It has an optical bench 38 and a flexible beam guide 40 for directing a laser beam to a throat 42 thence to a laser head 44. The head 44 is carried on a robot 46 having a five axis drive system 48. Each of the servomotors 50 have suitable associated tachometers 52 and encoders 54 to reference the drive of laser head 44 with respect to a workpiece such as the lap joint 14. The laser head 44 includes inner and outer gas shields of a known type (not illustrated).

Signals from the servomotors to a controller 56 and preprogrammed outputs from the controller 56 are utilized to establish the shape of the weld weave pattern 24 which welds the sheets 10, 12 together by a plurality of weld nuggets 58 in the finished product all of which produce a weld region 59 in which a metal bond is formed of uniformly good quality. Furthermore, as will be discussed, the weave pattern 24 is selected to enable high vapor pressure coating materials to be used without disrupting the welds formed by use of high density energy beam welding techniques.

Figure 3:
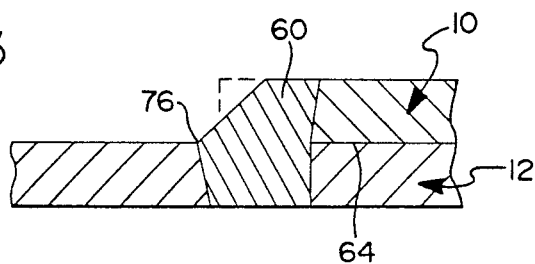
FIG. 3 is an enlarged sectional view taken along the line 3—3 of FIG. 2 looking in the direction of the arrows.
Figure 5:
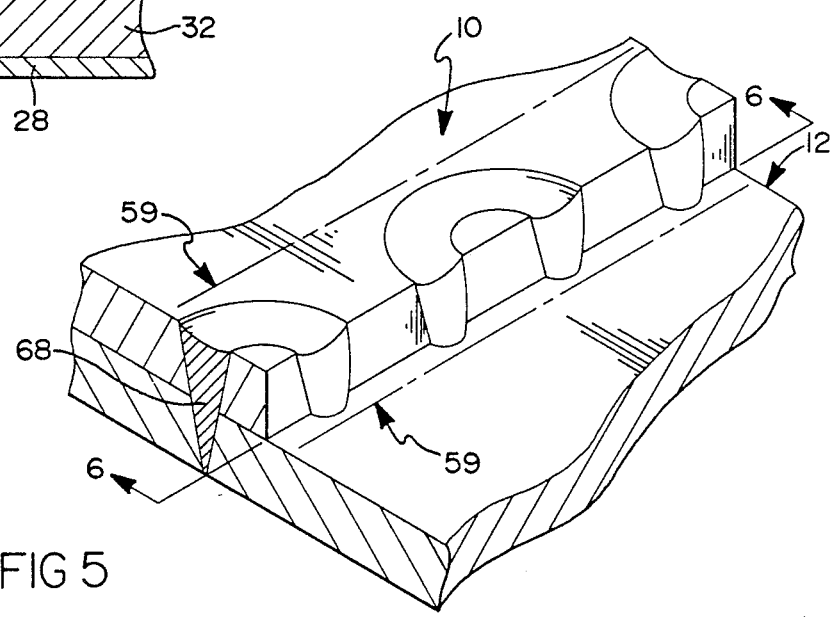
FIG. 5 is a perspective view of the finished product.

While the preferred embodiment uses a laser beam which deeply penetrates the sheets 10, 12 to form weld track 60 diagrammatically shown in FIG. 3, the invention is equally suitable for use with electron beam welding apparatus or other high energy non-contact welding apparatus which will raise the temperature at the interface between the juxtaposed sheets 10, 12 to form molten regions therebetween that will solidify to mechanically bond the sheets. Also as shown in FIGS. 3 and 5, the weld track 60 melts the material in the weld region 59 to form the uniform metal bond.

As discussed with reference to the prior art it is recognized that galvanized components are difficult to weld since zinc rich coatings have a vapor pressure which is much higher than the base mild steel sheet. Past solutions have either increased the cost of the base material because of special alloying to reduce the vapor pressure or have required special fixturing of the pieces to provide a gas escape path to relieve the high vapor pressure produced when the coating material is melted.

The present invention is used with standard galvanized sheets and thus reduces material costs. Also it provides a weld weave pattern that eliminates the need for special fixturing of the sheets. To this end, the controller 56 is preprogrammed to control the drive system 38 to advance the laser head 44 through a weld weave pattern 24 which will direct a high density energy beam 62 with respect to the lap joint 14 to form a pattern of welds that will have a desired strength at the joint and which will be of uniform undistorted quality.

As the beam 62 is advanced through the weld weave pattern 24 it will penetrate the juxtaposed sheets 10, 12 to raise the temperature thereof at the interface 64 of the lap joint 14.

The width 66 of the weave pattern 24 is sufficient to bridge the lap joint and the frequency 68 thereof is selected to produce a weld pool which, when cooled, forms a connection 70, shown in FIGS. 5 and 6, having the desired mechanical strength.

The path of the weave pattern 24 is representatively shown as sinusoidal and includes curved segments 72 which are concavely disposed with respect to the edge 16. The segments 72 penetrate overlapped sheets 10, 12 with high density energy when the head is tracked through the segments 72. The weave pattern 24 also has curved segments 74 which align the laser head 54 only with the surface 18 of the sheet 12. The lap joint configuration defines a side relief path 76 for escape of high vapor pressure from weld pools 60 formed at the interface 64 outboard of the segments 72.

The robot software inputted to the controller 56 in one working embodiment had the following listed parameters:
Linear speed: 6 mm/sec.
Weave width: 4 mm
Weave frequency: 1 cycle/mm
Gas pressure:
  inner shield—4 psi
  outer shield—15 psi The welding at the side edge 16 of the sheet 10 is believed to allow vapor pressure to escape in a controlled manner so as to not disrupt the molten weld pools formed by the deep penetration laser beam.

In the embodiment of the invention shown in FIG. 4, a clinched lap joint 80 is illustrated. It includes a first galvanized sheet 82 having a core and coating of the type previously discussed. It has an edge 84 thereon captured by a folded end 86 on a second sheet 88 of galvanized material 88 with a core and coating like sheet 82. The folded end 86 has an edge 90 that is lapped with respect to the edge 84 to form a clinched lap joint 92. The edge 90 and a weld weave pattern with a width 94 of the type discussed above combine to define a relief path 86 for the escape of vapor as in the case of the previous embodiment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method for welding galvanized steel comprising the steps of:
   electroplating mild steel with a gum coating of zinc;
   spraying the gum coated steel with a zinc rich coating having a thickness in the range of 0.001 to 0.3 millimeters;
   providing a plurality of sheets with the aforesaid first and second coatings and with an edge on each of the sheets;
   juxtaposing the plurality of sheets with one another to form a lapped joint at edges of at least two of said plurality of sheets; and
   laser welding the juxtaposed sheets at the lapped joint along a pattern which will bond the juxtaposed sheets to one another while providing for the escape of vapor generated at the weld pool through a path at the lapped joint.

2. In a method for joining a plurality of galvanized steel components by use of a high density energy beam the improvement comprising:
   providing a edge on each of the galvanized steel components;
   juxtaposing the galvanized steel components to provide a lap joint between the edges thereof;
   impinging the high density energy beam against one of the components and advancing it along a curvilinear path which overlaps the lap joint to provide a weld zone between the galvanized steel components having a vapor escape path at the lap joint.

3. In a method for welding first and second components having a coating of material with a vapor pressure greater than that of the coated material by use of a high density energy beam the improvement comprising:
   providing each of the first and second components with a edge portion arranged in a juxtaposed lapped relationship;
   advancing the high density energy beam along a path which intercepts the exposed surface of one of the components and penetrates to the other of the components to form a molten weld pool therebetween and which periodically intercepts only the other of the components to provide a vapor escape path from the molten weld pool through the juxtaposed lapped edge portions.

4. In the method of claim 3, providing each of said components in sheet form;
   and coating each of said sheets with a zinc rich coating to a thickness in the range of 0.001 to 0.3 millimeters.

5. In the method of claim 3, providing each of said components in sheet form;
   clinching one end of one of said sheets to form the lapped joint between the components.

6. In the method of claim 3, advancing the high density energy beam in a weave pattern having a width which overlaps an edge of at least one of the components.

7. In the method of claim 3, advancing the high density energy beam in a weave pattern having a width which overlaps the lapped joint and which has a weave to weave distance which is less than that of the width of the pattern.

8. In the method of claim 6, selecting a weave pattern having a weave to weave distance which is less than the width of the weave pattern.

9. In the method of claim 7, selecting a weave pattern having a weave to weave distance of one mm and a pattern width of 4 mm.

10. In a method for joining galvanized components having a coating with a vapor pressure greater than the vapor pressure of the coated material by use of energy which forms a molten pool between the components cooled to join the components the improvements comprising:
    positioning the galvanized components in a preselected relationship to define a vapor pressure relief path;
    applying a high density energy beam of non-contact weld energy to the positioned galvanized components to progressively melt each of the components to form a melt pool;
    progressively cooling the melt pool to bond the galvanized components together as the non-contact weld energy is applied thereto;
    and advancing the density energy beam in a weave pattern having a width which overlaps an edge of at least one of the components.

11. In a method for joining galvanized components having a coating with a vapor pressure greater than the vapor pressure of the coated material by use of energy which forms a molten pool between the components cooled to join the components the improvement comprising;
    positioning the galvanized components in a preselected lapped joint relationship to define a vapor pressure relief path;
    applying a high density energy beam of non-contact weld energy to the positioned galvanized components to progressively melt each of the components to form a melt pool;
    progressively cooling the melt pool to bond the galvanized components together as the non-contact weld energy is applied thereto;
    and advancing the high density energy beam in a weave pattern having a width which overlaps the lapped joint and which has a weave to weave distance which is less than that of the width of the weave pattern.

12. In a method for joining galvanized components having a coating with a vapor pressure greater than the vapor pressure of the coated material by use of energy which forms a molten pool between the components cooled to join the components the improvement comprising:
    positioning the galvanized components in a preselected lapped joint relationship to define a vapor pressure relief path;
    applying a high density energy beam of non-contact weld energy to the positioned galvanized components to progressively melt each of the components to form a melt pool;
    progressively cooling the melt pool to bond the galvanized components together as the non-contact weld energy is applied thereto;
    and advancing the high density energy beam in a weave pattern and selecting the weave pattern to have a weave to weave distance which is less than the width of the weave pattern.

13. In the method of claim 10, selecting a weave pattern having a weave to weave distance of one mm and a width of 4 mm.

14. In the method of claim 12, selecting a weave pattern having a weave to weave distance of one mm and a width of 4 mm.

15. In a method for joining a plurality of components having a protective metallic coating which produces a high vapor pressure when melted by use of a high density energy beam, the improvement comprising:
   providing an edge on each of the coated components:
   juxtaposing the coated components to provide a lap joint between the edges thereof;
   impinging the high density energy beam against one of the components and advancing it along a curvilinear path which overlaps the lap joint to provide a weld zone between the coated components each having a vapor escape path at the lap joint.

16. In a method for joining galvanized components having a coating which a vapor pressure greater than the vapor pressure of the coated material by use of energy which forms a molten pool between the components cooled to join the components the improvement comprising;
   providing each of the components in sheet form and coating each of said sheets with a zinc rich coating to a thickness in the range of 0.001 to 0.3 millimeters;
   positioning the galvanized components in a preselected relationship to define a vapor pressure relief path;
   applying a continuous stream of non-contact weld energy to the positioned galvanized components to progressively melt each of the components to form a melt pool; and
   progressively cooling the melt pool to bond the galvanized components together as the non-contact weld energy is applied thereto.

* * * * *